3,501,326
GLOSSY MICROPOROUS SHEET MATERIAL

Jerome Hochberg, Nashville, Tenn., and John L. Palermo, Springfield, Pa., assignors to E. I. du Pont de Nemours and Company, Wilmington, Del., a corporation of Delaware No Drawing. Continuation-in-part of application Ser. No. 490,093, Sept. 24, 1965. This application Oct. 28, 1966, Ser. No. 590,213

Int. Cl. B44d *1/14;* D21h *5/00*

U.S. Cl. 117—76         7 Claims

ABSTRACT OF THE DISCLOSURE

A glossy vapor permeable microporous sheet material is the subject of this invention that comprises a porous fibrous substrate having adhered thereto a microporous synthetic polymeric coating and in adherence with the microporous coating is a smooth, glossy, non-porous vapor permeable coating that has a surface reflectance of at least 50% at 60° measured according to ASTM Test No. D–523–62–T.

---

This application is a continuation-in-part of the co-pending application Ser. No. 490,093, filed Sept. 24, 1965, now abandoned.

This invention concerns non-porous vapor permeable sheet materials useful for making shoe uppers and particularly sheet materials of this type which are highly glossy. These materials can also be used to make ladies' handbags, purses, belts and other articles requiring strength, flexibility and a durable highly glossy surface.

A variety of materials having a high gloss finish have been commercially available for several years. Most of these materials are both non-porous and impervious to vapors and the remainder have vapor permeability values substantially less than the minimum required for comfortable shoe uppers. In addition, flexibility and scuff resistance of most of these materials is so low that they soon crack or lose their glossy appearance or both.

According to this invention, there is provided a durable highly glossy non-porous vapor permeable sheet material free from these deficiencies of the prior art materials and eminently suitable for shoe uppers, ladies' handbags, belts and other high style accessories. This sheet material is prepared from readily available materials and can be conveniently manufactured on conventional equipment.

Generally the highly glossy sheet materials of this invention comprise a flexible durable microporous foundation fabric and a superposed adhering coating of a non-porous vapor permeable synthetic polymeric material which has been applied or treated in a particular way to impart a high degree of gloss thereto. Any flexible and durable sheet material is suitable as the foundation fabric of this invention so long as it is microporous. However, a preferred foundation fabric is prepared by coating a fibrous substrate, such as a non-woven textile fabric, with a colloidal dispersion of a polymeric material in which the polymeric component has a secant tensile modulus of above about 600 pounds per square inch during the following bathing and drying condition of the coating process, bathing the coated fabric with a non-solvent for the polymeric component to coagulate the polymeric component into a microporous structure and drying the resulting microporous product. Even more preferable are the sheet materials prepared according to U.S. patent application Ser. No. 355,436 to Bateman, filed Mar. 27, now abandoned. Any of the products prepared as above or in accord with Ser. No. 355,436, are useful as foundation fabrics in operating this invention and the disclosures of the above patent application is hereby incorporated herein and made a part hereof.

The term "vapor permeability" as used in this specification refers to sheet materials and/or coatings having a vapor permeability value (often referred to as LPV or leather permeability value) of at least 600 grams per 100 square meters per hour as determined by the test described by Kanagy and Vickers in the Journal of the Leather Chemists Association, vol. 45, pp. 211–242 (Apr. 19, 1950). All of the products of this invention have vapor permeable values of at least 600 grams of water per 100 square meters per hour and usually of the order of several thousand.

The term "non-porous" as used in describing this invention refers to a sheet material or a coating of a synthetic polymeric material free from visible pores (as viewed by the naked eye or with a microscope of up to 300×power), which polymeric material in the form of an unsupported film one mil thick does not contain a significant number of light scattering gas/polymer interfaces.

The term "porous" refers to coatings and sheet materials which do not meet the test of non-porosity as set forth above. "Microporous" refers to porous materials, the pores of which are not discernible to the naked eye.

In accordance with a preferred embodiment of this invention a sheet material as described above is embossed in accordance with the processes of U.S. Patent 2,801,949 to Bateman and U.S. Patent 3,157,723 to Hochberg to enhance the degree of gloss of the sheet material and improve its jetness. In accordance with this procedure, a sheet material having a polymeric coating is placed in contact with a smooth film of cellophane, cellulose acetate, polyethylene terephthalate or the like and passed through the nip of the embossing cylinder and the pressure bladder described in U.S. Patent 3,157,723 with the smooth film in contact with the coating of the fabric. The pressure roller in contact with the film can be engraved or smooth depending upon whether a pattern is desired on the surface of the final product. In any event, the smooth film by being in contact with the polymeric coating of the coated fabric during passage between the aforementioned nip of the embossing roller and the pressure bladder imparts to the coating an extremely high gloss which is revealed in all its brilliance upon the removal of the film from the coated foundation fabric. So far as is known, no other convenient means is available at the present time to produce a vapor permeable non-porous synthetic polymeric coated fabric having such a high gloss. These products are eminently suitable for making shoe uppers and other accessories.

It is important that the vapor permeable non-porous synthetic polymeric coating applied to the foundation fabric have a thickness of about 0.1 to about 1.5 mil, and preferably, about 0.2–0.4 mil. This coating can be applied as a single layer or several layers so long as the total thickness does not exceed about 1.5 mil. When the coating comprises more than one layer, these may be the same or different polymeric materials. In accordance with a particularly preferred embodiment of this invention, the coating consists of two layers, each of a different polymeric material and with the embossing step taking place between application of the coatings.

Coatings of polymeric materials can be applied to the foundation fabric by any convenient procedure such as dip coating, spray coating, roller coating, doctor blade coating, lamination or the like so long as the coating has a uniform thickness. These coatings may be clear but are preferably pigmented and it is a particularly surprising attribute of this invention that products having coatings containing as much as 70% pigments by weight exhibit a highly glossy appearance.

The term "glossy," as used to describe this invention, refers to a surface having a reflectance of at least 50% at 60° in accordance with ASTM Test No. D–523–62–T. All of the products of this invention have at least this minimum degree of reflectance and some have a reflectance of over 94% on this basis A highly useful and preferred polymeric material for preparing the glossy non-porous vapor permeable coatings of this invention is a polyesterurethane prepared in accordance with U.S. Patent 2,871,218 to Schollenberger, and the disclosure of this patent is hereby incorporated into this specification and made a part thereof as illustrating useful polymeric coating materials.

Typically useful polyesterurethanes for the glossy coatings of this invention are prepared by reacting (1) a linear hydroxyl terminated polyester of a 4–10 carbon atom saturated aliphatic glycol and a saturated aliphatic dicarboxylic acid or an anhydride thereof, with (2) a phenyl diisocyanate, and (3) saturated aliphatic glycol having 4–10 carbon atoms. One preferred polyurethane for use as the glossy coating is the reaction product of hydroxyl terminated poly(tetramethylene adipate) diphenyl methane-p,p'-diisocyanate and 1,4-butane diol. Polyether polyurethanes described in U.S. Patent 3,000,-757, beginning on page 1, column 1, line 69 through page 2, column 1, line 30, can also be used.

Another synthetic polymeric material useful in forming glossy non-porous vapor permeable coatings in accordance with this invention is the polyetherurethane formed by reacting polypropylene glycol with a mixture of 2,4- and 2,6-toluene diisocyanate in a solvent such as Cellosolve acetate. The resulting isocyanate terminated prepolymer is then cross-linked with water in the presence of dibutyltin dilaurate dissolved in cyclohexanone for coating purposes.

One of the important uses for the sheet materials of this invention is in women's shoe uppers and one of the important characteristics of a sheet material for such use is the absence of roughening when shoes are lasted. It has been a perennial problem in the use of coated fabrics for shoe lastings that during the lasting operation, where the material must be stretched considerably, particularly in the toe and heel areas where there is substantial curvature, that the textile fibers in the fabric substrate tend to show their presence by imparting a textured appearance to the surface coating This uneven and unsightly appearance is called "roughening" and must be avoided by candidate shoe materials. This roughening is particularly noticeable with sheet materials having highly glossy surfaces and one of the most bothersome problems in producing highly glossy sheet materials useful in high style products particularly women's shoe uppers, has been to produce such a material which would not exhibit roughening during the shoe lasting operation.

It has been found in accordance with this invention that use of microporous foundation fabrics having a density of at least 0.36 gram per cubic centimeter produces highly glossy products in accordance with this invention which are non-roughening. This is not to say that useful shoe upper materials cannot be prepared from foundation fabrics having a density less than 0.36 gram per cubic centimeter but such fabrics must be first treated to raise their density to this minimum level if roughening is to be avoided. A convenient method for doing this is to compact such a fabrics by passing through the nip of pressure rollers with the pressure regulated to provide at least the above minimum density in the processed material. Thereafter the fabric can be processed in accordance with this invention to produce a highly glossy non-porous vapor permeable sheet material useful as shoe uppers and not exhibiting the deficiency called roughening.

Polymers that are useful in this invention for forming the foundation fabric of a microporous sheet material have a secant tensile modulus at 5% elongation of above about 600 pounds per square inch (p.s.i.) during the entire processing cycle, i.e., from the time the polymer is coagulated into a microporous structure until it is dried. Generally, a microporous structure formed from polymers which in consolidated form have a secant tensile modulus below about 600 p.s.i. collapses as the liquid is being removed or after the liquid is removed from the micropores of the structure so that a relatively impermeable product is formed. Preferably, the secant tensile modulus during the cycle is about 600–25,000 p.s.i. and more preferably about 800–10,000 p.s.i., and still more preferably, about 800–3000 p.s.i. The secant tensile modulus is the ratio of the stress to the strain at 5% elongation of the specimen determined from the tensile stress-strain curve and is expressed as force per unit area, e.g., pounds per square inch. The secant tensile modulus measurement is carried out according to ASTM D–882–64–T modified as described below.

The secant tensile modulus of the polymer useful for forming the foundation fabric of this invention is determined by forming a 5 to 20 mil continuous void-free polymer film from the polymeric solution used in the process to form the microporous sheet material of this invention. The film is formed by casting this polymer solution on a glass plate and the solution is then dried, e.g., at 105° C. for 90 minutes.

The stress-strain curve which is necessary to calculate the secant tensile modulus of the polymer used in the invention to form the microporous foundation fabric is preferably obtained on an Instron Tensile Tester using a ½ inch wide specimen cut from the above prepared polymeric film with about one inch between grips. The following settings are preferably used on the Instron Tester to obtain a stress-strain curve: chart speed of 10 inches per minute, cross head speed of 1 inch per minute, and a full scale load of 2 to 5 pounds.

The secant tensile modulus is obtained from the chart of the force vs. strain curve by drawing a line at 5% elongation (strain) parallel to the force axis of the chart. The point at which this line intersects the force/strain curve defines the force in pounds necessary to elongate the specimen 5%. This force value is divided by the initial cross-sectional area of the specimen to give the corresponding stress value in pounds per square inch. This stress value is divided by the strain (0.05) to give the secant tensile modulus.

To initially select polymers useful in this invention for forming the microporous foundation fabric, the test temperature is usually room temperature, about 23° C. At this temperature, polymers potentially useful in this invention have a secant tensile modulus at 5% elongation above 600 p.s.i. However, as previously stated, polymers useful in this invention have a secant tensile modulus at 5% elongation of above about 600 p.s.i. during the entire process cycle; therefore, the highest temperature used during the process for forming the microporous product should be used as the test temperatrues, e.g., if the drying temperature is 140° C., the secant tensile modulus of a potentially useful polymer should be tested at 140° C. and at this test temperature, the secant tensile modulus at 5% elongation should be above about 600 p.s.i.

Preferably, the microporous foundation fabric of this invention utilizes a polyurethane polymer. One process for making a microporous foundation fabric of polyurethane polymer is disclosed in U.S. Patent 3,100,721 to E. K. Holden. Polymers useful in forming the microporous foundation fabric have a secant tensile modulus of above about 600 p.s.i. and are polyurethanes either alone or in a mixture with other polymers, such as a vinyl chloride polymer. One class of polyurethanes useful in this invention for forming the foundation fabric are polyureas, that is, polyurethanes containing the recurring structural unit:

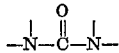

The prepolymers for the polyurethanes are prepared by mixing one or more polyalkyleneether glycols or hydroxyl-terminated polyesters with a molar excess of organic diisocyanate and heating the mixture to a temperature of about 50–100° C. to form a prepolymer having terminal —NCO groups. An alternate procedure is to react the diisocyanate with a molar excess of polyalkyleneether glycol or polyester, then cap the resulting product, that is, react with more diisocyanate to form a prepolymer having terminal —NCO groups.

The preferred polyurethanes are the chain-extended ployurea type which are formed from aliphatic polyol segments which include the polyalkyleneether glycols having $C_3$–$C_{12}$ alkylene segments and the hydroxyl-terminated polyester of $C_3$–$C_{12}$ acyclic dicarboxcyclic and $C_3$–$C_{12}$ alkylene glycol. Polyalkyleneether glycols are the preferred active hydrogen containing material for the prepolymer formation. The most useful polyglycols have a molecular weight of 300 to 5000, preferably 400 to 2000; some of these polyglycols are, for example, polyethyleneether glycol, polypropyleneether glycol, polytetramethyleneether glycol, polyhexamethyleneether glycol, polydecamethyleneether glycol, polydodecamethyleneether glycol, and mixtures thereof. Polyglycols containing several different radicals in the molecular chain such as the compound $HO(CH_2OC_2H_4O)_nH$ wherein $n$ is an integer greater than 1 can also be used.

The preferred polyurethanes are prepared with at least a major portion of an aromatic, aliphatic or cycloaliphatic diisocyanates or mixtures thereof; for example, tolylene-2,4 - diisocyanate, tolylene - 2,6-diisocyanate, m-phenylene diisocyanate, biphenyl - 4,4' - diisocyanate, methylene bis - (4-phenyl isocyanate), 4 - chloro-1,3-phenylene diisocyanate, naphthalene - 1,5-diisocyanate, tetramethylene - 1,4-diisocyanate, hexamethylene - 1,6-diisocyanate, decamethylene - 1,10-diisocyanate, cyclohexylene - 1,4-diisocyanate, methylene bis - (4-cyclohexylisocyanate) and tetrahydronaphthalene diisocyanate. Arylene diisocyanates in which the isocyanate groups are attached to an aromatic ring are preferred since these isocyanates react more readily than do alkylene diisocyanates.

Polyesters that have the aforementioned secant tensile modulus can be used instead of or in conjunction with polyalkyleneether glycols, particularly those formed by reacting acids, esters or acid halides with glycols. Suitable glycols are polyalkylene glycols, such as methylene-, ethylene-, propylene-, tetramethylene-, decamethylene glycol; substituted polyalkylene glycols, such as 2,2-dimethyl-1,3-propanediol; cyclic glycols, such as cyclohexanediol and aromatic glycols, such as xylylene glycol. Aliphatic glycols are generally preferred when maximum product flexibility is desired and when making microporous articles. These glycols are reacted with aliphatic, cycloaliphatic or aromatic dicarboxylic acids or lower alkyl esters or ester forming derivatives to produce relatively low molecular weight polymers, preferably having a melting point of less than about 70° C., and molecular weights like those indicated for the polyalkyleneether glycols. Acids for preparing such polyesters are succinic, adipic, suberic, sebacic, terephthalic and hexahydro-terephthalic acids and the alkyl and halogen substituted derivatives of the acids.

Hydrazine is preferred as the chain-extending agent for the preferred polyurethanes, although $C_1$–$C_6$ (including cycloaliphatic) diamines, such as ethylene diamine, hexamethylene diamine and dimethyl piperazine and 1,4-diamino/piperazine can also be used advantageously either alone or in a mixture with hydrazine.

A particularly preferred chain-extender which is reacted with the isocyanates terminated prepolymer has the structural formula

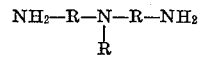

wherein R is

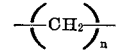

and $n$ is from 1–4. The preferred compound is N-methyl-amino-bis-proylamine. It is usually best to use a blend of a minor proportion, preferably about 5–30 mole percent, of the above preferred chain-extender with a major proportion, about 95–70 mole percent, of another compound having two active hydrogen atoms bonded to amino-nitrogen atoms, preferably hydrazine. Other chain-extending compounds which can be used along with the preferred compound are monosubstituted hydrazines, dimethyl piperazine, 4-methyl - m-phenylenediamine, m-phenylene-diamine, 4,4'-diamino - diphenylmethane, 1,4-diamino-piperazine, ethylene diamine and mixtures thereof.

Mixtures of at least one vinyl polymer with a polyurethane can be used to prepare the microporous foundation fabric. Such mixtures, preferably containing polyvinyl chloride as the vinyl polymer, can contain from 1 to 2% of vinyl chloride polymer to about 50% thereof.

Preferably, microporous polyurethane foundation fabrics used as a leather replacement contain a porous fibrous substrate to give the material the rigidity and strength required for this use. Such substrates are, for example, wovens, such as twills, drills and ducks; jersey, tricot and knitted materials; felts, needle punched batts, porous batts impregnated with synthetic resins, such as styrene/butadiene, acrylic, vinyl halide, and polyurethane polymers. The choice of the particular fibers from which the substrate is made is not critical; they include those made from polyamides, polyesters, polyesteramides, acrylic polymers, viscose rayon, wool, cotton, glass and mixtures thereof. Elastomeric fibers and elastic fibers can be also used. Porous non-woven, needle punched, heat shrunk batts of polyethylene terephthalate fibers impregnated with one or more of the aforementioned polymers are particularly preferred. The preferred sheet material contains about 30–60% fiber by weight and about 70–40% of a microporous polyurethane polymer.

The following examples illustrate the invention. All parts are by weight unless otherwise indicated and all coating weights are on a dry basis. All products produced and described as "glossy" are characterized by a reflectance of at least 50% at an incidence angle of 60° as measured in accordance with ASTM Test Number D–523–62T. The permeability value (LPV) of all products in these examples is greater than 900.

EXAMPLE 1

A mixture capable of forming a glossy vapor permeable coating is prepared by dissolving about 4.5 parts of a polyesterurethane having an average molecular weight of about 90,000 and about 2 parts of a pigment composition in about 93.5 parts of tetrahydrofuran. The polyesterurethane is prepared according to the procedure of U.S. Patent 2,871,218 and is commercially available from the B. F. Goodrich Company under the trademark "Estane 5707–F1." The pigmented composition consists of 20% very finely ground carbon black having an average particle size of about 0.01 micron, 12% dibutyl phthalate and 68% copolymerized vinyl chloride-vinyl acetate resin ("Vinylite" Series V grade PYHH sold by Union Carbide Corporation). A dip tank having a roll disposed across its open top is filled with this mixture to a level immersing the lower portion of the roll.

A microporous sheet material dyed black with Nigrosine dye (C. I. Acid Black 2) and comprising a microporous coating on a fibrous substrate is prepared according to Example 1 of patent application Ser. No. 355,436, filed Mar. 27, 1964, and compacted to a density of 0.36 gram per cubic centimeter by passing between an embossing cylinder and a pressure bladder as described in U.S. Patent 3,157,723. This sheet material is passed around the dip tank roll with its substrate side contacting the roll and coated surface exposed to the mixture. The manner in which the material wraps around the roll and mixture level is selected so the mixture contacts only the coated side and edges of the sheet material. A material speed of about 2 yards per minute results in application to the material of a coating weighing about 0.20 ounce per square yard (dry weight).

The coated material is dried in an oven at about 115° C. There results a vapor permeable glossy non-porous sheet material having an LPV of about 900 grams per 100 square meters per hour. Shoe uppers are formed from this material by ordinary shoe making methods without occurrence of roughening. Durability, flex life, shape retention and breathability of these shoes surpass similar shoes having comparable gloss.

EXAMPLE 2

A dried coated material, the product in Example 1, is embossed by placing a sheet of polyethylene terephthalate in contact with the coating and pressing it according to the process of U.S. Patent 2,801,949 and equipment of U.S. Patent 3,157,723 using an engraved pressure roll. The polyethylene terephthalate sheet is removed and a glossy vapor permeable non-porous sheet material having a granular surface pattern is produced. This material is used to make high style women's shoe uppers and no roughening occurs. A similar sheet material is produced when a regenerated cellulose film is used in place of the aforementioned sheet of polyethylene terephthalate.

EXAMPLE 3

A clear topcoat is applied to a dried coated material, the product in Example 2, using the same dip tank arrangement. This topcoat is prepared by mixing about 23.4 parts of a 60% solution of polyetherurethane having an average molecular weight of about 100,000 in ethylene glycol mono-ethyl ether acetate and about 1.9 parts of a 4% solution of dibutyltin dilaurate in cyclohexanone with about 74.7 parts of methyl ethyl ketone. The polyurethane is prepared from polyethylene glycol having an average molecular weight of about 1200 and a mixture of 2,4- and 2,6-tolulene diisocyanate in Cellosolve acetate, the resulting prepolymer being cross-linked with water in the presence of dibutyltin dilaurate dissolved in cyclohexanone.

Material speed through this solution is about 0.5 yard per minute. Upon leaving the dip tank, the topcoating is cured by exposure to 125–135° C. for about 15 minutes in air containing about 0.008–1.0 gram of water per cubic foot. The resulting sheet material is non-porous and vapor permeable and has an excellent combination of gloss and surface durability and is used to make women's shoes, handbags and accessories without occurrence of roughening.

EXAMPLE 4

A 5% solids dispersion is prepared by admixing 56.5 parts titanium dioxide, 9.5 parts polyvinyl butyral and 34 parts of a polyurethane, prepared in accordance with U.S. Patent 2,929,802, with a 50/50 mixture of toluene/ethanol. A microporous sheet material (45 mils thick) undyed, prepared in accordance with Example 1 is coated with this dispersion using a dip tank as described in Example 1. The speed of the material through the dip tank is regulated to provide a coating, after being dried for six minutes at 130° C., of about one ounce per square yard. The thus coated surface was embossed by placing a length of cellophane in contact with the coated surface according to the process described in U.S. Patent 2,801,949 and U.S. Patent 3,157,723 using an engraved pressure roll. The cellophane sheet is then removed from the resulting highly glossy vapor permeable non-porous sheet material which has an attractive leather-like surface pattern.

EXAMPLE 5

A dispersion suitable for producing a high gloss vapor permeable coating for microporous products is prepared by admixing 761.7 grams "Primal" white (a 38% dispersion of TiO$_2$ in water), 802.2 grams "Primal" HA-24 (an aqueous latex containing 45% solids) and 48.4 grams leveling agent[1] (LMA–65) with 271.4 grams of water. This dispersion was sprayed to a thickness of one mil (dry) over a sample of the microporous material utilized in Example 1 and then dried for six minutes at 110° C. The dried fabric was then spray coated with 0.3 mil (dry) of a dispersion prepared from the following ingredients:

| | Grams |
|---|---|
| Water | 354.2 |
| "Primal" white (a 38% dispersion of TiO$_2$ in water) | 185.4 |
| "Primal" HA–12[1] (46% polyacrylamide latex) | 217.8 |
| "Primal" E–32[1] (45% polyacrylonitrile) | 217.8 |
| "Primal" E–191[1] (acrylic release agent) | 40 |
| Dulling agent[1] (20% dispersion in water) | 140 |
| Leveling agent[1] (LMA–65) | 20 |

[1] Purchased from Rohm & Haas.

The fabric was then dried for six minutes at 110° C. and subsequently coated at the rate of 0.05 ounce per square yard with a 5% solution of cellulose acetate butyrate followed by again drying for six minutes at 230° F. The thrice coated fabric was then embossed in accordance with U.S. Patent 2,801,949 and U.S. Patent 3,157,723 using a length of cellophane and an engraved pressure roll to produce a highly glossy non-porous vapor permeable sheet material having an attractive grain surface pattern.

EXAMPLE 6

A black dyed microporous sheet material (45 mils thick) such as used in Example 5 is dip coated in the following dispersion at the rate of 0.5 ounce per square yard:

| | |
|---|---|
| "Monastral" Red B dispersion (15% by weight aqueous dispersion of gamma linear qinacrodone, prepared according to the process of U.S. Patent 2,844,581) | 15.2 |
| "Monastral" Blue BB dispersion (20% by weight aqueous dispersion of β-copper phthalacyanine, C. I. Pigment Blue 15) | 1.9 |
| Carbon black | 2.9 |
| Methylmethacrylate/butadiene/partially iminated methacrylic acid (Latex A of Example 1 of Ser. No. 553,643, filed May 31, 1966 now U.S. Patent 3,455,727) | 31.2 |
| Water | 48.8 |

The coated fabric was dried at 110° C. for six minutes and then embossed using the process of U.S. Patent 2,801,949 with a length of cellophane to produce a glossy non-porous vapor permeable sheet material having an attractive grain surface pattern. By embossing with a roll or plate having matte stripes engraved thereon, there is produced a non-porous permeable sheet material having alternating matte and glossy stripes.

We claim:
1. A vapor permeable glossy sheet material consisting essentially of
   (1) a fibrous substrate having adhered thereto a microporous synthetic polymer coating (A) wherein the polymeric component of said coating (A) has a secant tensile modulus at 5% elongation of above about 600 p.s.i., and
   (2) a vapor permeable non-porous coating (B) in superposed adherence with said microporous coating, said dried coating (B) having a thickness of about 0.1–1.5 mils and having a reflectance of at least 50% at 60° measured in accordance with ASTM Test No. D-523-62-T and being substantially free of light scattering, gas/polymer interfaces and pores visible with a 300× power microscope and consisting essentially of a synthetic polymeric material which in the form of an unsupported film one mil thick has a vapor permeability value of at least 600 grams of water per 100 square meters per hour.
2. The sheet material of claim 1 in which the polymeric component is at least 50% by weight of a polyetherurethane and up to 50% by weight polyvinyl chloride.
3. The sheet material of claim 1 in which said coated fibrous substrate has a uniform density of at least 0.36 gram per cubic centimeter.
4. The sheet material of claim 1 in which coating B is a tough, essentially linear polyesterurethane elastomer comprising the reaction product of
   (1) an essentially linear hydroxyl terminated polyester of a saturated aliphatic glycol having from 4 to 10 carbon atoms and a carboxylic acid of the formula HOOC—R—COOH where R is an alkylene radical containing from 2 to 8 carbon atoms or its anhydride,
   (2) a diphenyl diisocyanate having an isocyanate group on each phenyl nucleus,
   (3) a saturated, aliphatic glycol containing from 4 to 10 carbon atoms and having hydroxyl groups on its terminal carbon atoms, the molar amount of said polyester and said glycol combined being essentially equivalent to the molar amount of said diphenyl diisocyanate whereby there are essentially no unreacted isocyanate and hydroxyl groups in said reaction product.
5. The sheet material of claim 1 in which coating B comprises at least two layers in superposed adherence with each other.
6. The sheet material of claim 5 in which each of the two layers is a synthetic polymeric material which is chemically different from the other.
7. The sheet material of claim 5 in which the second layer in superposed adherence with the B coating of a polyesterurethane is an isocyanate terminated polyetherurethane of an alkylene glycol and a phenyl diisocyanate which is cross-linked with a material having two active hydrogen atoms.

References Cited
UNITED STATES PATENTS

| | | |
|---|---|---|
| 2,871,218 | 1/1959 | Schollenberger. |
| 3,100,721 | 8/1963 | Holden. |
| 3,000,757 | 9/1961 | Johnston et al. __ 117—135.5 XR |
| 3,238,055 | 3/1966 | Brightwell. |

DAVID KLEIN, Primary Examiner

U.S. Cl. X.R.

117—11, 135.5